United States Patent [19]

Brisson

[11] 4,152,085
[45] May 1, 1979

[54] WALKING BEAM ATTACHMENT FOR REAR AXLES AND THE LIKE

[76] Inventor: Arthur J. Brisson, Box 4, Group 14, R.R. #1, Dryden, Canada

[21] Appl. No.: 786,011

[22] Filed: Apr. 8, 1977

[30] Foreign Application Priority Data

Feb. 16, 1977 [CA] Canada .................................. 271878

[51] Int. Cl.² ........................................... F16C 11/06
[52] U.S. Cl. ..................................... 403/161; 403/227
[58] Field of Search ................. 403/161, 162, 163, 93, 403/96, 150, 154, 168, 220, 224, 225, 226, 227, 228

[56] References Cited

U.S. PATENT DOCUMENTS

| 1,251,965 | 1/1918 | Coatalen | 403/154 X |
| 2,810,587 | 10/1957 | Boughner | 403/228 X |
| 3,943,349 | 12/1975 | Herbst | 403/228 X |

Primary Examiner—Wayne L. Shedd

Attorney, Agent, or Firm—Stanley G. Ade

[57] ABSTRACT

Conventional connections include a sleeve having a rubber bushing thereon and engaging through apertures in the pair of ears depending from the rear axle. The ends of the sleeve are externally screw threaded and relatively large nuts engage over the ends of the sleeve outside of each ear and are tightened so that the sleeve is frictionally held in position. These screw threads readily strip and when a bushing is worn, it is usual that new sleeves and nuts are required. With the present device, the sleeve engages through the ears and end caps engage over the ends of the sleeve and against the outside of the ears. A relatively small diameter high tensile bolt and nut assembly engages through the end caps, the ears and the sleeve and the nuts can be torqued so that the end caps bear against the ears and clamp the assembly in position. Much greater torque values can be used without danger of stripping and in one embodiment, means are provided to prevent any possibility of rotational movement of the sleeve when in use.

1 Claim, 5 Drawing Figures

WALKING BEAM ATTACHMENT FOR REAR AXLES AND THE LIKE

BACKGROUND OF THE INVENTION

The present invention relates to new useful improvements in means of attaching walking beams to supports such as rear axles.

These walking beams are usually engaged with a sleeve having a resilient bushing therebetween, said sleeve then engaging through supporting gears on the vehicle whereupon relatively large diametered nuts are screw threadably engageable over the screw threaded ends of the sleeve. When these nuts are tightened, they bear against the two ears and sufficient force is provided to hold the sleeve frictionally within the ears. Unfortunately the relatively large diameter of the sleeve and the nuts precludes heavy torquing. This together with the fact that the environment within which such devices operate are often unfavourable, causes rusting, corrosion and the like to occur so that in many instances, the sleeve will turn with the bushing rather than being stationary with the bushing engaged thereupon.

This causes undue wear so that replacement is necessary at frequent intervals.

This replacement usually requires complete replacement of the sleeve, the bushing, and the nuts and as these elements are relatively expensive, maintenance also becomes expensive.

The nuts normally used are relatively thin and the threads strip at approximately 200 foot lbs. torque and although wider nuts are sometimes available, nevertheless these are relatively expensive, often costing in the neighbourhood of $15.00 each.

SUMMARY OF THE INVENTION

The present invention overcomes this disadvantages by eliminating the screw threaded ends of the sleeves and incorporating end caps and a high tensile nut and bolt assembly which can be torqued to a much greater degree.

One object of the invention is to provide a device of the character herewithin described which comprises in combination a support sleeve extending between and through the conventional ears and supporting the usual bushing sleeve and the attaching end of the walking beam. Means are provided engaging each end of the sleeve and outer surfaces of the ears and independent clamp means extend through the sleeve to clamp the said means and said sleeve in position relative to the ears.

Another object of the invention is to provide a device of the character herewithin described, which, if desired, may incorporate means to prevent relative rotation of the said means with the sleeve.

A yet further object of the invention is to provide a device of the character herewithin described which is simple in construction, economical to manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
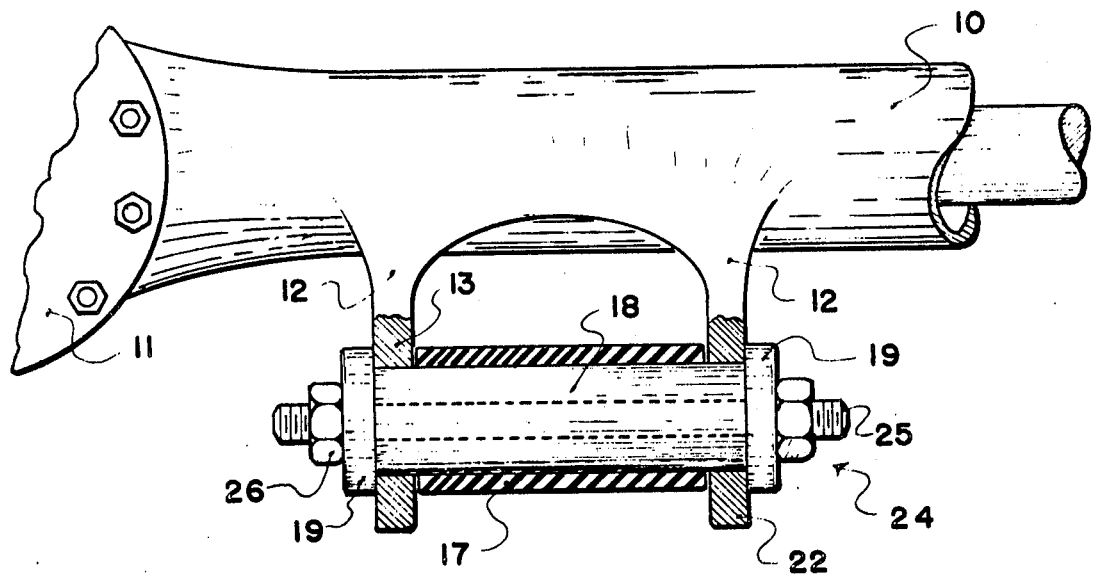
FIG. 1 is a front elevation partially sectioned, showing the device installed.
Figure 2:
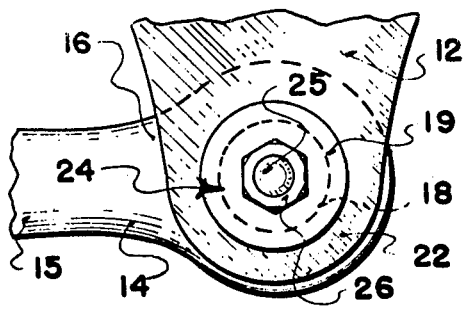
FIG. 2 is a fragmentary end view of FIG. 1.
Figure 3:
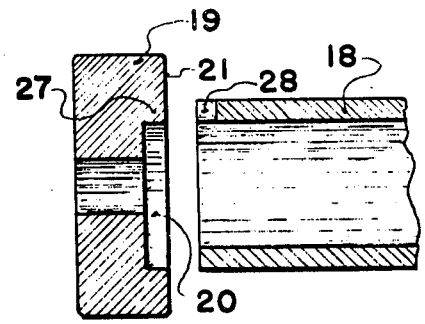
FIG. 3 is a cross sectional fragmentary view of one of the end caps and the end of the sleeve.
Figure 4:
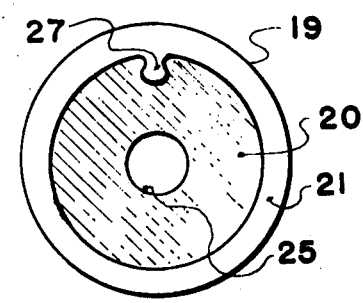
FIG. 4 is an inside end view of the cap per se.
Figure 5:
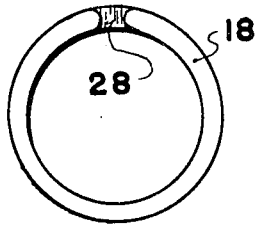
FIG. 5 is an end view of the sleeve per se.

Proceeding therefore to describe the invention in detail reference character 10 illustrates part of the rear axle of a truck or other heavy-duty vehicle extending from the differential casing 11 shown in fragmentary form.

A pair of ears 12 are welded to the underside of the axle casing 10 and extend downwardly therefrom in a spaced and parallel relationship one with the other and these ears are apertured as at 13.

The end 14 of a walking beam 15, is enlarged as indicated at 16 and is apertured to provide an attaching end and this apertured enlarged end 16 engages over a cylindrical resilient bushing 17 supported between the ears 12 as will hereinafter be described.

The bushing engages freely over a metal sleeve 18 which extends between and through the apertures 13 in the ears 12.

A cylindrical end cap 19 is situated at each end of the sleeve 18 externally of the ears 12. This cylindrical end cap is recessed on the inner side thereof as indicated by reference character 20 to receive the end of the sleeve 18 which engages the base of the recess. The inner surface 21 of the end cap engages the outer surface 22 of the ears when installed as clearly illustrated.

A high tensile nut and bolt assembly collectively designated 24 extends through a central aperture 25 within the end cap, and through the sleeve 18. It includes the bolt 25 with nuts 26 upon each end thereof and it will be observed that the diameter of this bolt 25 is considerably less than the diameter of the sleeve 18 so that much greater torquing effort can be applied without the danger of stripping occurring.

In operation, the device is assembled as described and illustrated with the nuts 26 being tightened sufficiently to clamp the end caps over the ends of the sleeve and to engage the ears so that the entire assembly is held rigidly within the ears. Due to the fact that greater torquing effort can be applied, there is far less danger of relative rotation taking place but if desired, means are provided to prevent relative rotation of the sleeve with the end caps. This takes the form of an inwardly extending projecting portion 27 extending into the recess 20 and engaging a notch 28 formed on the end of the sleeve so that there is no possibility of relative rotation between the sleeve and the end caps once the device is installed.

With this device, replacement of the sleeve per se is relatively easy and, the nut and bolt assembly are much more economical to manufacture than the conventional externally screw threaded sleeve with the relatively large diametered nuts used therewith.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. In a walking beam attachment for trucks, heavy-duty vehicles and the like which include a walking beam with an apertured attaching end, a resilient bushing sleeve located within the aperture in said apertured attaching end and a pair of spaced and parallel apertured clamping ears extending from a supporting surface and to which said walking beam is pivotably connected; the improvement comprising, in combination, a support sleeve extending between and through the said ears and engageable by the said bushing sleeve and the attaching end of the walking beam means engaging each end of said sleeve and the outer surfaces of said ears and independent clamp means extending through said sleeve to clamp said engaging means and said sleeve in position relative to said ears, said engaging means comprising a detachable end cap disposed at each end of said sleeve and having an inner and outer face, each said end cap being recessed on the said inner face thereof to receive the end of said sleeve, said inner face engaging the outer surface of the adjacent ear, said independent clamp means comprising a nut and bolt assembly comprising a bolt and at least one nut, said nut operatively engaging the outer face of one of said end caps and the diameter of said bolt being substantially less than that of said sleeve, said improvement further comprising means cooperating between said sleeve and said end caps to provide positive engagement so as to prevent relative independent rotation.

* * * * *